Oct. 18, 1932.  W. A. GEIGER  1,882,801
SHOCK ABSORBER
Filed June 5, 1931
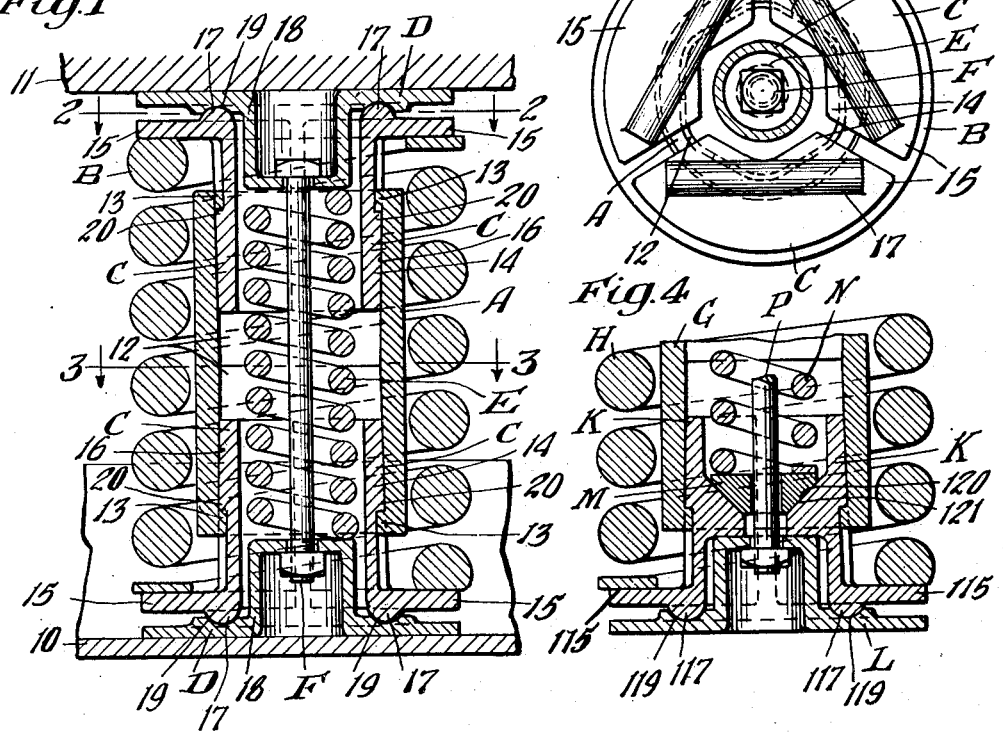
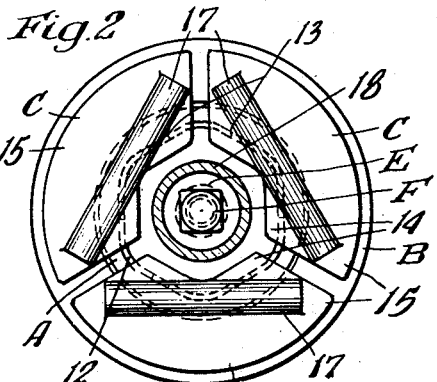
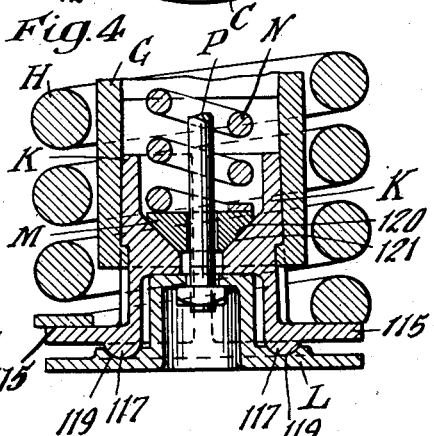
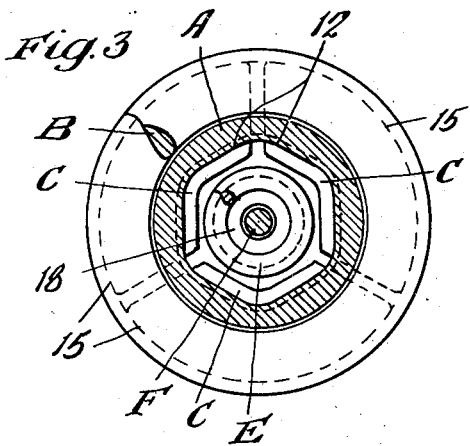
Inventor
William A. Geiger
By Henry Fuchs Atty.

Patented Oct. 18, 1932

1,882,801

UNITED STATES PATENT OFFICE

WILLIAM A. GEIGER, OF CHICAGO, ILLINOIS, ASSIGNOR TO W. H. MINER, INC., OF CHICAGO, ILLINOIS, A CORPORATION OF DELAWARE

SHOCK ABSORBER

Application filed June 5, 1931. Serial No. 542,210.

This invention relates to improvements in shock absorbers.

One object of the invention is to provide a shock absorber of the friction type of simple and rugged design, having high capacity produced by the combined action of spring means and a plurality of cooperating, relatively movable friction elements, wherein the frictional contact is provided by rocking action of certain of said elements toward the others, the rocking action being effected through compression of the spring resistance of the mechanism.

Another object of the invention is to provide a mechanism of the character specified in the preceding paragraph which is particularly designed for use in connection with the spring clusters of car trucks.

A more specific object of the invention is to provide a friction shock absorbing mechanism of the double-ended type, including a friction shell having interior friction surfaces at opposite ends thereof, a plurality of friction shoes cooperating with the friction surfaces at each end of the shell, spring means surrounding the shell and opposing relative approach of the shoes lengthwise of the mechanism, follower members at opposite ends of the mechanism for moving the two sets of shoes toward each other, and a spring means within the shell opposing relative approach of the followers, wherein the friction shoes have rocking engagement with the followers and are rocked thereon by the action of the spring which surrounds the shell.

A further object of the invention is to provide a friction shock absorbing mechanism as specified in the preceding paragraph, wherein the inner spring cooperates with spring follower members having wedging engagement with the inner ends of the friction shoes to spread the same apart.

Other objects of the invention will more clearly appear from the description and claims hereinafter following.

In the drawing, forming a part of this specification, Figure 1 is a vertical sectional view through the bottom portion of the truck bolster and the spring plank of a railway car, also illustrating my improvements in connection therewith in vertical section. Figure 2 is a top plan view on the line 2—2 of Figure 1, illustrating my improved shock absorber with the end follower removed. Figure 3 is a transverse, horizontal sectional view, corresponding substantially to the line 3—3 of Figure 1. And Figure 4 is a view similar to Figure 1, illustrating another embodiment of the invention, the spring plank being omitted in this view and the upper part of the shock absorbing mechanism being broken away.

Referring first to the embodiment of the invention illustrated in Figures 1, 2, and 3, 10 designates the usual spring plank of a railway car truck, and 11 the truck bolster. My improved shock absorbing device, which is herein illustrated as associated with the springs of a car truck, preferably forms the central resilient member of the spring cluster and is interposed between the spring plank and the bolster of the truck.

My improved shock absorber, as illustrated in Figures 1, 2, and 3, comprises broadly a friction shell A, a spring B, two sets of rocking friction shoes C—C—C and C—C—C, two end followers D—D, a second spring resistance E, and a retainer bolt F.

The friction shell A is in the form of a tubular member having an interior cross-section of hexagonal form. The opposite ends of the friction shell are provided with interior friction surfaces. At each end of the shell, the same is provided with preferably three such surfaces 12—12—12, each surface being of V-shaped section and including two of the inner faces of the hexagonal interior section of the shell. The opposed friction surfaces are preferably converged inwardly of the shell, as clearly shown in Figure 1. Each friction surface is shouldered at the outer end, as indicated at 13, thereby providing stop means for limiting the outward movement of the corresponding friction shoe C. The friction shoes C—C, which are arranged in sets at opposite ends of the mechanism, have rocking engagement with the corresponding end followers D—D and also have bearing engagement with the spring B. The friction shoes C—C are all of like design, and each shoe comprises a longitudinally disposed section 14 and a laterally, outwardly projecting section 15, the latter being in the form of a lever arm. The section 14 of each shoe C is provided with a V-shaped outer friction surface 16 extending lengthwise thereof and cooperating with one of the friction surfaces 12 of the shell A. The section 14 of the shoe is preferably of V shape. Adjacent to the upper portion, the outer side of the section 14 of each shoe is shouldered, as indicated at 20, so as to cooperate with the shoulder 13 of the corresponding friction shell surface and limit outward movement of the shoe. At the outer end where the section 15 of the shoe joins the section 14, the shoe is provided with a bearing projection 17 which is elongated, as shown most clearly in Figure 2.

The spring B surrounds the friction shell A and has its upper and lower ends bearing respectively on the arms 15—15 of the upper and lower seats of friction shoes C—C.

The end followers D—D are disposed above and below the two sets of friction shoes, and as shown, are in the form of disc members having inwardly projecting, hollow central bosses 18—18 which form abutments for the opposite ends of the spring resistance E which is disposed within the friction shell A. Each end follower D is provided with three bearing seats 19—19—19 which cooperate respectively with the bearing projections 17—17—17 of the three friction shoes C—C—C.

The entire mechanism is held assembled and in proper uniform overall length by the retainer bolt F, which has the head thereof anchored in the hollow boss of the upper end follower D and is anchored to the boss of the lower follower D by means of a nut.

In the operation of my improved shock absorbing mechanism, as shown in Figures 1, 2, and 3, the followers D—D are moved toward each other during the shock absorbing action. Movement of the followers D—D toward each other causes the shoes at opposite ends of the mechanism to be forced inwardly of the friction shell A. Inasmuch as the spring B opposes movement of the shoes during this action and is also compressed by relative approach of the shoes, each shoe will be rocked on the corresponding follower D, the arm 15 of the shoe acting as a lever member and the shoe rocking on the bearing 17 within the bearing seat 19. The section 14 of the shoe will thus be forced laterally outwardly against the corresponding friction surface of the friction shell A. The friction surfaces of the shoes will thus be maintained in tight frictional engagement with the shell surfaces throughout the compression of the mechanism. Inasmuch as the spring B is compressed throughout the operation of the device, the force acting on the lever arms of the shoes will gradually increase as compression progresses, thus increasing the pressure between the friction surfaces of the shoes and shell with resultant progressive increase in capacity of the shock absorbing device. During the relative approach of the end followers D—D, the inner spring E is also directly compressed between said followers.

When the actuating force is reduced, the springs B and E will return the parts to normal position, the spring E directly forcing the followers D—D outwardly until limited by the retainer bolt F. The friction shoes will be forced apart directly by the spring B. Inasmuch as the shoes have shouldered engagement with the shell, the shoes will act to restore the shell to normal centered position after each compression stroke of the mechanism.

Referring next to the embodiment of the invention illustrated in Figure 4, the shock absorbing device in addition to the rocking friction shoes operating within the friction shell described in connection with Figures 1, 2, and 3, comprises also wedging spring followers which cooperate with the spring disposed within the friction shell to wedge the inner ends of the friction shoes outwardly. The improved mechanism, as shown in Figure 4, comprises broadly a friction shell G, an outer spring resistance H, two sets of rocking friction shoes K—K—K and K—K—K, two end followers L—L, two spring followers M—M, a second spring resistance N, and a retainer bolt P.

The friction shell G is of substantially the same design as the friction shell A hereinbefore described and is surrounded by the spring resistance H which has its opposite ends bearing on the laterally outwardly projecting sections 115—115 of the friction shoes K—K, which shoes are broadly of the same design as the shoes C—C hereinbefore described. The shoes K differ from the shoes C in that they have interior wedge faces at the inner ends thereof which cooperate with the spring followers M—M. Each shoe has rocking bearing engagement with the corresponding end follower L through bearing projections 117 cooperating with bearing seats 119 on the end followers.

The two spring followers M—M are arranged at opposite ends of the mechanism within the friction shell G and cooperate with the corresponding friction shoes K—K. Each follower M has three wedge faces 120—120—120 at the outer end thereof having wedging engagement with wedge faces 121—121 provided respectively on the three shoes. The opposite ends of the spring N bear directly on the inner sides of the two spring followers M—M. The retainer bolt P holds the mechanism assembled and in uniform overall length precisely as does the retainer bolt F hereinbefore described.

The operation of the shock absorber illustrated in Figure 4 is the same as that of the device described in connection with Figures 1, 2, and 3, with the exception that additional pressure is provided between the friction shoes and surfaces of the friction shell by means of the wedging action of the spring followers M—M.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having interior friction surfaces at the opposite ends thereof; of end followers movable toward and away from the shell; friction shoes at opposite ends of the shell having sections extending into the latter, said shoes having rocking engagement with the end followers, each shoe having an arm rigid therewith extending laterally outwardly from the point of rocking engagement of the shoe with the corresponding follower; a spring resistance surrounding said shell and bearing at opposite ends on the arms of the shoes; and additional spring resistance means within the shell opposing movement of said end followers toward each other.

2. In a friction shock absorbing mechanism, the combination with a friction shell having interior friction surfaces at the opposite ends thereof; of end followers movable toward and away from the shell; friction shoes at opposite ends of the shell having sections extending into the latter, said shoes having rocking engagement with the end followers, each shoe having an arm rigid therewith extending laterally outwardly from the point of rocking engagement of the shoe with the corresponding follower; and a spring resistance surrounding said shell and bearing at opposite ends on the arms of the shoes, each shoe having shouldered engagement with the shell to limit outward movement of the shoe.

3. In a friction shock absorbing mechanism, the combination with a friction shell having interior friction surfaces at the opposite ends thereof; of end followers movable toward and away from the shell; friction shoes at opposite ends of the shell having sections extending into the latter, said shoes having rocking engagement with the end followers, each shoe having an arm rigid therewith extending laterally outwardly from the point of rocking engagement of the shoe with the corresponding follower; a spring resistance surrounding said shell and bearing at opposite ends on the arms of the shoes, each shoe having shouldered engagement with the shell to limit outward movement of the shoe; and a retainer bolt connecting said end followers and limiting outward separation thereof.

4. In a friction shock absorbing mechanism, the combination with a friction shell having interior friction surfaces at the opposite ends thereof; of end followers movable toward and away from the shell; friction shoes at opposite ends of the shell having sections extending into the latter, said shoes having rocking engagement with the end followers, each shoe having an arm rigid therewith extending laterally outwardly from the point of rocking engagement of the shoe with the corresponding follower; a spring resistance surrounding said shell and bearing at opposite ends on the arms of the shoes; spring followers within the shell at opposite ends thereof having wedging engagement with the shoes; and additional spring resistance means opposing inward movement of said spring followers.

In witness that I claim the foregoing I have hereunto subscribed my name this 3rd day of June, 1931.

WILLIAM A. GEIGER.